US010345674B2

United States Patent
Middlebrook et al.

(10) Patent No.: US 10,345,674 B2
(45) Date of Patent: Jul. 9, 2019

(54) ELECTRO-OPTIC MODULATOR, MICROWAVE PHOTONIC LINK INCLUDING AN ELECTRO-OPTIC MODULATOR, AND METHOD OF COMMUNICATING A SIGNAL WITH AN ELECTRO-OPTIC MODULATOR

(71) Applicant: MICHIGAN TECHNOLOGICAL UNIVERSITY, Houghton, MI (US)

(72) Inventors: Christopher T. Middlebrook, Houghton, MI (US); Arash Hosseinzadeh, Hancock, MI (US)

(73) Assignee: MICHIGAN TECHNOLOGICAL UNIVERSITY, Houghton, MI (US)

(*) Notice: Subject to any disclaimer, the term of this patent is extended or adjusted under 35 U.S.C. 154(b) by 0 days.

(21) Appl. No.: 15/550,337

(22) PCT Filed: Feb. 12, 2016

(86) PCT No.: PCT/US2016/017649
§ 371 (c)(1),
(2) Date: Aug. 10, 2017

(87) PCT Pub. No.: WO2016/130872
PCT Pub. Date: Aug. 18, 2016

(65) Prior Publication Data
US 2018/0031946 A1 Feb. 1, 2018

Related U.S. Application Data
(60) Provisional application No. 62/115,556, filed on Feb. 12, 2015.

(51) Int. Cl.
*G02B 6/00* (2006.01)
*G02F 1/225* (2006.01)
(Continued)

(52) U.S. Cl.
CPC ....... *G02F 1/2257* (2013.01); *G02B 6/29338* (2013.01); *G02F 1/2255* (2013.01);
(Continued)

(58) Field of Classification Search
CPC ......................................................... G02B 6/00
(Continued)

(56) References Cited

U.S. PATENT DOCUMENTS 5,002,353 A  3/1991  Johnson
6,522,794 B1* 2/2003 Bischel .................. G02F 1/011
                                                              385/10
(Continued)

FOREIGN PATENT DOCUMENTS

CN     103281136 A     9/2013
WO     2016130872 A1   8/2016

OTHER PUBLICATIONS

"Wireless future drives microwave photonics," Nat Photon, vol. 5, pp. 724-724,12//print 2011.
(Continued)

Primary Examiner — Kaveh C Kianni
(74) Attorney, Agent, or Firm — Michael Best & Friedrich LLP

(57) ABSTRACT

An electro-optic modulator coupled to an optical source providing an optical power and a radio frequency source providing a radio frequency power. The electro-optic modulator includes a waveguide to receive the optical power, a first ring resonator modulator, and a second ring resonator modulator. The first ring resonator modulator and the second ring resonator modulator receives the radio frequency power, and are coupled to the waveguide for modulating the optical power with the radio frequency power. The first ring resonator modulator and the second ring resonator modulator, with the waveguide, substantially suppress third order
(Continued)

intermodulation distortion of a combined power. Also disclosed are a microwave photonic link having the electro-optic modulator and a method of communicating a signal with the electro-optic modulator.

20 Claims, 4 Drawing Sheets

(51) Int. Cl.
    G02B 6/293      (2006.01)
    H04B 10/50      (2013.01)
    G02F 1/21       (2006.01)
(52) U.S. Cl.
    CPC ..... *H04B 10/505* (2013.01); *G02F 2001/212* (2013.01); *G02F 2203/15* (2013.01)
(58) Field of Classification Search
    USPC ...................................................... 385/3, 14
    See application file for complete search history.

(56) References Cited

U.S. PATENT DOCUMENTS

| | | | |
|---|---|---|---|
| 6,943,931 B1 | 9/2005 | Dingel | |
| 7,616,843 B2 | 11/2009 | Ishizaka | |
| 7,805,026 B2 | 9/2010 | Gill | |
| 8,498,539 B1 | 7/2013 | Ilchenko et al. | |
| 8,582,937 B2 | 11/2013 | Xu | |
| 8,849,071 B2 | 9/2014 | Kissa et al. | |
| 8,873,896 B1 | 10/2014 | Kissa | |
| 2002/0039470 A1 | 4/2002 | Braun et al. | |
| 2005/0063035 A1* | 3/2005 | Mitchell | G02F 1/225 359/247 |
| 2005/0185681 A1* | 8/2005 | Ilchenko | H01S 5/146 372/20 |
| 2005/0248823 A1* | 11/2005 | Maleki | G06E 3/005 359/245 |
| 2006/0008272 A1 | 1/2006 | Abeles | |
| 2007/0009205 A1* | 1/2007 | Maleki | G02B 6/122 385/27 |
| 2007/0019896 A1 | 1/2007 | Darcie et al. | |
| 2009/0231686 A1* | 9/2009 | Atkins | G02B 6/12002 359/341.3 |
| 2010/0098372 A1 | 4/2010 | Manipatruni et al. | |
| 2011/0002591 A1 | 1/2011 | Lu et al. | |
| 2012/0194893 A1* | 8/2012 | Maleki | G02F 2/02 359/246 |
| 2012/0301075 A1* | 11/2012 | Wang | G02B 6/1225 385/28 |
| 2013/0170781 A1 | 7/2013 | Kissa et al. | |
| 2014/0050235 A1 | 2/2014 | Clowes et al. | |

OTHER PUBLICATIONS

Agarwal et al., "Predistortion compensation of nonlinearities in channelized RF photonic links using a dual-port optical modulator," Photonics Technology Letters, IEEE, vol. 23, pp. 24-26, 2011.
Ayazi et al., "Linearity of silicon ring modulators for analog optical links," Opt. Express20 (12), pp. 13115-13122, 2012.
Bortnik et al., "Electrooptic polymer ring resonator modulation up to 165 GHz," Selected Topics in Quantum Electronics, IEEE Journal of, vol. 13, pp. 104-110, 2007.
Bridges et al., "Distortion in linearized electrooptic modulators," Microwave Theory and Techniques, IEEE Transactions on, vol. 43, pp. 2184-2197, 1995.
Cardenas et al., "Linearized silicon modulator based on a ring assisted Mach Zehnder inteferometer," Optics express, vol. 21, pp. 22549-22557, 2013.
Cox III et al., Analog optical links: theory and practice: Cambridge University Press, 2006.
Fegadolli et al.,"Highly linear electro-optic modulator based on ring resonator," Microwave and Optical Technology Letters, vol. 53, pp. 2375-2378, 2011.
Gheorma et al., "Fundamental limitations of optical resonator based high-speed EO modulators," IEEE Photonics Technology Letters, vol. 14, pp. 795-797, Jun. 2002.
Hunziker et al., "Simple model for fundamental intermodulation analysis of RF amplifiers and links," Electronics Letters, vol. 32, pp. 1826-1827, 1996.
Johnson et al., "Reduction intermodulation distortion in interferometric optical modulators," Optics letters, vol. 13, pp. 928-930, 1988.
Kim et al.,"Nonlinear intermodulation distortion suppression in coherent analog fiber optic link using electro-optic polymeric dual parallel Mach-Zehnder modulator," Optics express, vol. 19, pp. 7865-7871, 2011.
Madamopoulos et al., "Interferometric modulator with phase-modulating and cavity-modulating components (IMPACC) for high linearity microwave applications: technology review," in International Conference on Photonics Solutions 2013, 2013, pp. 88830O-88830O-12.
Nazarathy et al., "Progress in externally modulated AM CATV transmission systems," Lightwave Technology, Journal of, vol. 11, pp. 82-105, 1993.
Prescod et al., "Effect of ring resonator waveguide loss on SFDR performance of highly linear optical modulators under suboctave operation," Photonics Technology Letters, IEEE, vol. 22, pp. 1297-1299, 2010.
Tazawa et al., "Bandwidth of linearized ring resonator assisted Mach-Zehnder modulator," Photonics Technology Letters, IEEE, vol. 17, pp. 1851-1853, 2005.
Urick et al., "Long-haul analog photonics," Journal of Lightwave Technology, vol. 29, pp. 1182-1205, 2011.
Vanblaricum, "Photonic systems for antenna applications," Antennas and Propagation Magazine, IEEE, vol. 36, pp. 30-38, 1994.
Xie et al., "Linearized Mach-Zehnder Intensity Modulator," IEEE Photonics Technology Letters, vol. 15, pp. 531-533, 2003.
Yariv, "Universal relations for coupling of optical power between microresonators and dielectric wave guides," Electronics Letters, vol. 36, pp. 321-322, 2000.
Zhang et al., "Postcompensation for nonlinearity of Mach-Zehnder modulator in radio-over-fiber system based on second-order optical sideband processing," Optics letters, vol. 37, pp. 806-808, 2012.
Zhang et al., "Pushpull electro-optic polymer modulators with low half-wave voltage and low loss at both 1310 and 1550 nm," Applied Physics Letters, vol. 78, pp. 3136-3138, 2001.
International Preliminary Report on Patentability and Written Opinion for Application No. PCT/US2016/017649 dated Aug. 24, 2017 (10 pages).
Marpaung et al., "A photonic chip based frequency discriminator for a high performance microwave photonic link," Optics Express vol. 18, pp. 27359-27370, 2010.
Tazawa et al., "Analysis of Ring Resonator-Based Traveling-Wave Modulators," Photonics Technology Letters, IEEE, vol. 18, pp. 211-213, 2006.
International Search Report and Written Opinion for Application No. PCT/US2016/017649 dated Jun. 21, 2016 (16 pages).
International Search Report and Written Opinion for Application No. PCT/US2016/017650 dated May 31, 2016 (16 pages).
International Preliminary Report on Patentability for Application No. PCT/US2016/017650 dated Aug. 23, 2018 (9 pages).

\* cited by examiner

ELECTRO-OPTIC MODULATOR, MICROWAVE PHOTONIC LINK INCLUDING AN ELECTRO-OPTIC MODULATOR, AND METHOD OF COMMUNICATING A SIGNAL WITH AN ELECTRO-OPTIC MODULATOR

CROSS-REFERENCE TO RELATED APPLICATION(S)

This is a U.S. national stage entry of International Patent Application No. PCT/US2016/017649, filed on Feb. 12, 2016, which claims priority to U.S. Provisional Patent Application No. 62/115,556, filed on Feb. 12, 2015, the entire contents of all of which are fully incorporated herein by reference.

BACKGROUND

The invention relates to an electro-optic modulator, a microwave photonic link including an electro-optic modulator, and a method of communicating a signal with an electo-optic modulator.

SUMMARY

In one embodiment, the invention provides a highly linear dual ring resonator modulator design. The dual ring resonator modulator provides high spur-free dynamic range in a wide bandwidth. Harmonic and intermodulation distortions are theoretically analyzed in a single ring resonator modulator structure and a strategy is proposed to enhance the linearity of the single ring resonator design for wide bandwidth applications by utilizing dual ring resonator modulators. Third order intermodulation distortion is suppressed with proper splitting ratio of optical and radio frequency power and optimum direct current biasing of the ring resonators. The structure shows the ability to obtain spur-free dynamic range more than 130 decibels at 1 hertz microwave operating frequency while keeping the spur-free dynamic range greater than 125 decibels and up to 5 gigahertz bandwidth.

In another embodiment, the invention provides an electro-optic modulator for coupling to an optical source providing an optical power and a radio frequency source providing a radio frequency power. The electro-optic modulator includes a waveguide to receive the optical power, a first ring resonator modulator, and a second ring resonator modulator. The first ring resonator modulator and the second ring resonator modulator receive the radio frequency power, and are coupled to the waveguide for modulating the optical power with the radio frequency power, thereby providing a resultant power. Combination of the first ring resonator modulator and the second ring resonator modulator, substantially suppress third order intermodulation distortion of the resultant power.

In yet another embodiment, the invention provides a microwave photonic link having the electro-optic modulator. The microwave photonic link includes an optical source providing the optical power and a radio frequency source providing a radio frequency power. The electro-optic modulator is coupled to the optical source and the radio frequency source.

In a further embodiment, the invention provides a method of communicating a signal with an electro-optic modulator. The method includes receiving an optical power providing a carrier signal, receiving a first radio frequency power providing a communication signal, and receiving a second radio frequency power providing the communication signal. The method further includes splitting the optical power into a first optical power and a second optical power, transmitting the first optical power over a first waveguide segment of the waveguide to a first ring resonator modulator, and transmitting the second optical power over a second waveguide segment of the waveguide to a second ring resonator modulator. The method also includes providing the first radio frequency power to the first ring resonator modulator, providing the second radio frequency power to the second ring resonator modulator, modulating the first optical power with the first radio frequency power using the first ring resonator modulator, and modulating the second optical power with the second radio frequency power using the second ring resonator modulator. Combination of the first ring resonator modulator and the second ring resonator modulator, substantially suppress third order intermodulation distortion of the resultant power.

Other aspects of the invention will become apparent by consideration of the detailed description and accompanying drawings.

DETAILED DESCRIPTION

Figure 1:
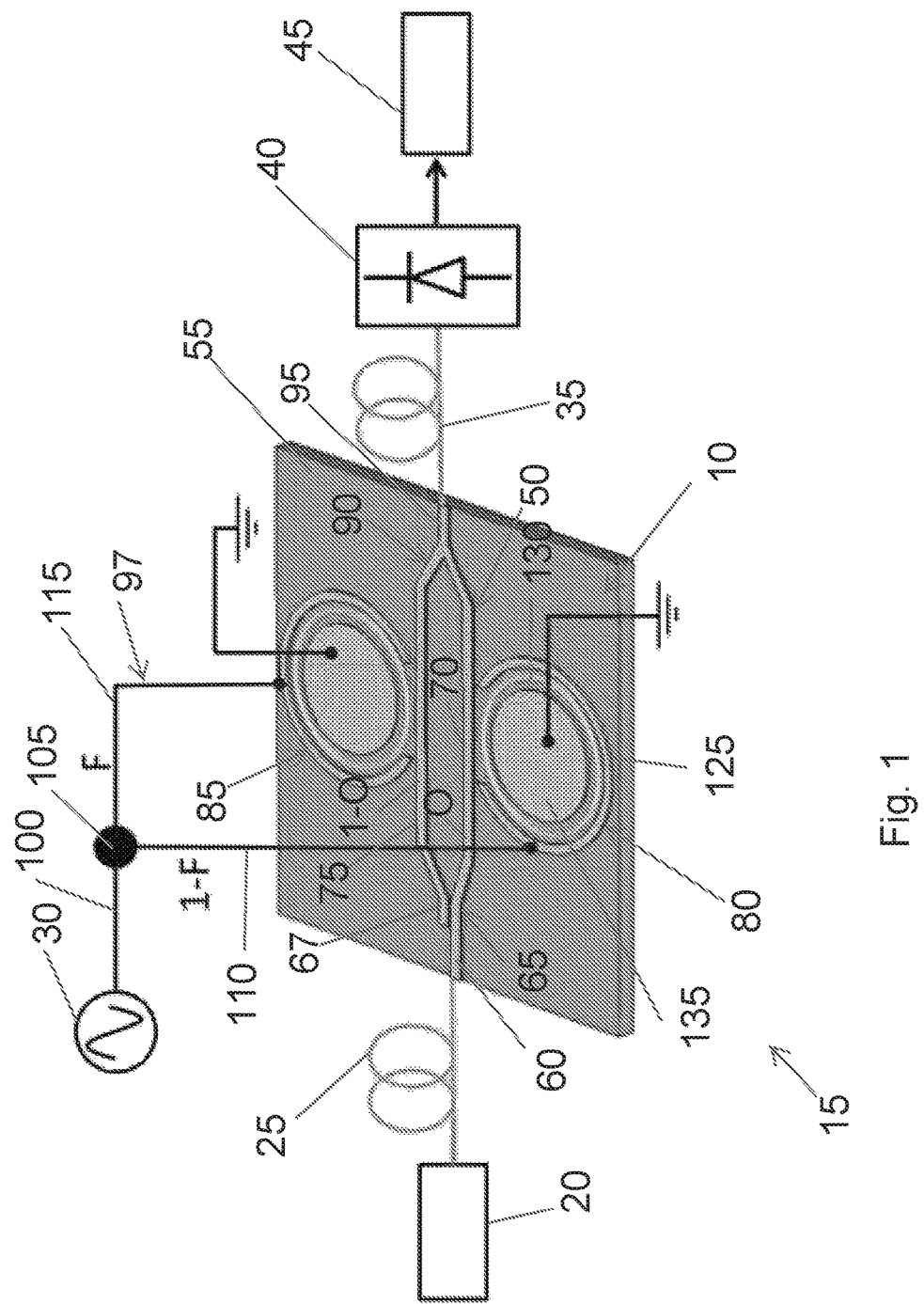
FIG. 1 is a schematic illustrating a microwave photonic link including an electro-optic modulator.

Before any embodiments of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Introduction

Microwave photonic links (MPLs) are critical for applications such as wireless-access networks, antenna remoting, and video distribution networks. See, for example, "Wireless future drives microwave photonics," *Nat Photon*, vol. 5, pp. 724-724, 12//print 2011, M. L. VanBlaricum, "Photonic systems for antenna applications,"*Antennas and Propagation Magazine, IEEE*, vol. 36, pp. 30-38, 1994, and M. Nazarathy, J. Berger, A. J. Ley, I. M. Levi, and Y. Kagan, "Progress in externally modulated AM CATV transmission systems," *Lightwave Technology, Journal of*, vol. 11, pp. 82-105, 1993. Nonlinear distortions remain as one of the fundamental limitations for full scale implementation of microwave photonic links. See, for example, V. J. Urick, F. Bucholtz, J. D. McKinney, P. S. Devgan, A. L. Campillo, J. L. Dexter, et al., "Long-haul analog photonics," *Journal of Lightwave Technology*, vol. 29, pp. 1182-1205, 2011. To evaluate linearity in microwave photonic links, the spur-free dynamic range (SFDR) is a widely accepted performance metric. See, for example, C. H. Cox III and C. H. Cox, *Analog optical links: theory and practice*: Cambridge University Press, 2006. The dominating distortion in microwave photonic links is the third order intermodulation distortion (IMD3) occurring at frequencies very close to the signal frequencies.

Current microwave photonic links may utilize Mach-Zehnder interferometers (MZI) as electro-optic (E/O) modulators, resulting in nonlinear distortions. Ongoing research efforts have been focused on achieving a highly linear modulator for microwave photonic links with limited success. See, for example, J. Cardenas, P. A. Morton, J. B. Khurgin, A. Griffith, C. B. Poitras, K. Preston, et al., "Linearized silicon modulator based on a ring assisted Mach Zehnder inteferometer," *Optics express*, vol. 21, pp. 22549-22557, 2013; N. Madamopoulos, B. Dingel, and A. Prescod, "Interferometric modulator with phase-modulating and cavity-modulating components (IMPACC) for high linearity microwave applications: technology review," in *International Conference on Photonics Solutions* 2013, 2013, pp. 88830O-88830O-12. While gains have been made, the devices are very complex. Mach-Zehnder interferometers have an inherent non-linear sinusoidal transfer function. To increase the linearity in Mach-Zehnder interferometers various approaches have been proposed including predistortion, postcompensation, and dual parallel Mach-Zehnder interferometers. See, for example, A. Agarwal, T. Banwell, P. Toliver, and T. Woodward, "Predistortion compensation of nonlinearities in channelized RF photonic links using a dual-port optical modulator," *Photonics Technology Letters, IEEE*, vol. 23, pp. 24-26, 2011; G. Zhang, X. Zheng, S. Li, H. Zhang, and B. Zhou, "Postcompensation for nonlinearity of Mach-Zehnder modulator in radio-over-fiber system based on second-order optical sideband processing," *Optics letters*, vol. 37, pp. 806-808, 2012; S.-K. Kim, W. Liu, Q. Pei, L. R. Dalton, and H. R. Fetterman, "Nonlinear intermodulation distortion suppression in coherent analog fiber optic link using electro-optic polymeric dual parallel Mach-Zehnder modulator," *Optics express*, vol. 19, pp. 7865-7871, 2011. To improve the linearity of Mach-Zehnder interferometer modulators two categories have proposed utilizing ring resonators, namely, 1) resonator-assisted Mach-Zehnder interferometer (RAMZI), and 2) interferometric modulator with phase-modulating and cavity-modulating (IMPAAC) components. See, for example, J. Cardenas, P. A. Morton, J. B. Khurgin, A. Griffith, C. B. Poitras, K. Preston, et al., "Linearized silicon modulator based on a ring assisted Mach Zehnder inteferometer," *Optics express*, vol. 21, pp. 22549-22557, 2013; N. Madamopoulos, B. Dingel, and A. Prescod, "Interferometric modulator with phase-modulating and cavity-modulating components (IMPACC) for high linearity microwave applications: technology review," in *International Conference on Photonics Solutions* 2013, 2013, pp. 88830O-88830O-12. In these modulators one ring resonator is coupled to a branch of a Mach-Zehnder interferometer. In a resonator-assisted Mach-Zehnder Interferometer, the phase response of the ring resonator is used to enhance the linearity in the Mach-Zehnder interferometer. Ring resonator phase response is controlled by the coupling coefficient between the ring resonator and the Mach-Zehnder interferometer branch. The exact value of the coupling coefficient is highly dependent upon the fabrication process and design layout making it difficult to predict this value to great precision. In an interferometric modulator with phase-modulating and cavity-modulating component, the amplitude response of the ring resonator on one branch of a Mach-Zehnder interferometer is used along with a phase modulator on another branch. The radio frequency signal is divided between amplitude and phase modulators in a specific ratio. The resonator-assisted Mach-Zehnder interferometer and interferometric modulator with phase-modulating and cavity-modulating component both require a Mach-Zehnder interferometer and thus inherit the sinusoidal transfer function, required size, and power requirements. The resonator-assisted Mach-Zehnder interferometer and interferometric modulator with phase-modulating and cavity-modulating component structures add complexity to the fabrication and integration process and their operation is sensitive to the structure properties including loss factor of the ring, coupling coefficient, and working frequency. See for example, N. Madamopoulos, B. Dingel, and A. Prescod, "Interferometric modulator with phase-modulating and cavity-modulating components (IMPACC) for high linearity microwave applications: technology review," in *International Conference on Photonics Solutions* 2013, 2013, pp. 88830O-88830O-12; H. Tazawa and W. H. Steier, "Bandwidth of linearized ring resonator assisted Mach-Zehnder modulator," *Photonics Technology Letters, IEEE*, vol. 17, pp. 1851-1853, 2005; and A. Prescod, B. B. Dingel, N. Madamopoulos, and R. Madabhushi, "Effect of ring resonator waveguide loss on SFDR performance of highly linear optical modulators under suboctave operation," *Photonics Technology Letters, IEEE*, vol. 22, pp. 1297-1299, 2010.

Ring resonator modulators (RRM) attracted interest because of its potential to enhance linearity, reduce the size, and power consumption in microwave photonic links. See, for example, A. Ayazi, T. Baehr-Jones, Y. Liu, A. E.-J. Lim, and M. Hochberg, "Linearity of silicon ring modulators for analog optical links," *Opt. Express* 20 (12), pp. 13115-13122, 2012. The ring resonator modulator is used as intensity modulators with a Lorentzian shaped transfer function versus applied voltage that yields suppressing of various nonlinear distortions at special bias voltages. See, for example, W. Fegadolli, J. E. B. Oliveira, and V. R. Almeida, "Highly linear electro-optic modulator based on ring resonator,"*Microwave and Optical Technology Letters*, vol. 53, pp. 2375-2378, 2011. Another advantage of the Lorentzian transfer function of the ring resonator modulator is its repetition in frequency because of the periodicity of the ring resonator resonance in frequency domain. The frequency difference between the two subsequent resonances is called Free-Spectral Range (FSR) of the ring resonator. It has been shown that ring resonator modulators with traveling wave electrodes can be operated at multiples of the Free-Spectral Range, as high as 165 gigahertz in polymer. See, for example, B. Bortnik, Y.-C. Hung, H. Tazawa, B.-J. Seo, J. Luo, A. K.-Y. Jen, et al., "Electrooptic polymer ring resonator modulation up to 165 GHz," *Selected Topics in Quantum Electronics, IEEE Journal of*, vol. 13, pp. 104-110, 2007. These advantages provide more freedom in designing modulators in comparison with Mach-Zehnder Interferometer modulators. However, the bandwidth of ring resonator modulators is limited because of the resonance characteristics similar to other resonance type of modulators. See, for example, I. L. Gheorma and R. M. Osgood, "Fundamental limitations of optical resonator based high-speed EO modulators," *Ieee Photonics Technology Letters*, vol. 14, pp. 795-797, June 2002. In all of the resonator type modulators, including resonator-assisted Mach-Zehnder interferometer and interferometric modulator with phase-modulating and cavity-modulating components, bandwidth is a limiting factor in dynamic ranges. See, for example, N. Madamopoulos, B. Dingel, and A. Prescod, "Interferometric modulator with phase-modulating and cavity-modulating components (IM-PACC) for high linearity microwave applications: technology review," in *International Conference on Photonics Solutions* 2013, 2013, pp. 88830O-88830O-12; H. Tazawa and W. H. Steier, "Bandwidth of linearized ring resonator assisted Mach-Zehnder modulator," *Photonics Technology Letters, IEEE*, vol. 17, pp. 1851-1853, 2005.

A microwave photonic link is shown in FIG. 1. The microwave photonic link includes an electro-optic modulator 10 having dual ring resonator modulator. The electro-optic modulator 10 provides for wide bandwidth applications utilizing a highly linear dual ring resonator structure resulting in a significant increase of the spur-free dynamic range. The dynamic response of a single ring resonator modulator is analyzed by deriving analytical equations for nonlinear distortions. Obtained equations show the influence of the bandwidth in suppressing the spur-free dynamic range making single ring resonator modulators not suitable for the wide bandwidth applications. It is shown herein how the fundamental signal power and distortions power are related to the driving radio frequency power and feeding optical power. Using an analytical method a dual ring resonator that can suppress third order intermodulation distortion in wide bandwidth is presented.

Single Ring Resonator

To evaluate the linearity of the transfer function with the chosen properties of the electro-optic material, a dynamic transfer function is determined according to the multiple round-trip approach given by (Eq. 1). See, for example, H. Tazawa and W. H. Steier, "Analysis of ring resonator-based traveling-wave modulators," *Photonics Technology Letters, IEEE*, vol. 18, pp. 211-213, 2006, and H. Zhang, M.-C. Oh, A. Szep, W. H. Steier, C. Zhang, L. R. Dalton, et al., "Push-pull electro-optic polymer modulators with low half-wave voltage and low loss at both 1310 and 1550 nm," *Applied Physics Letters*, vol. 78, pp. 3136-3138, 2001.

$$\left|\frac{E_{out}(t)}{E_{in}(t)}\right|^2 = \left[\tau - (1-\tau^2)\sum_{n=1}^{\infty}\tau^{n-1}\alpha^n \times e^{-i(n\theta+\delta_n\sin(\omega_m t - n\varphi))}\right]^2 \quad \text{(Eq. 1)}$$

where $\tau$ defines the coupling coefficient between output and input, $\alpha$ is the round-trip loss factor of the ring and in this work critical coupling condition (see, for example, A. Yariv, "Universal relations for coupling of optical power between microresonators and dielectric waveguides," *Electronics Letters*, vol. 36, pp. 321-322, 2000.) is assumed between the ring resonator and the base waveguide with $\alpha=\tau=0.8$. In (Eq. 1) n is the number of times the beam propagates inside the ring and $\theta$ is the round trip phase shift due to the steady state refractive index of the ring and applied direct current bias voltage. Steady state phase shift due to the refractive index of the ring is not considered in the calculations. In (Eq. 1) $\delta_n$ is the modulation index and in the case of lumped electrode that fully covers the ring it is given by:

$$\delta_n \sin(\omega_m t - n\varphi) = \frac{\pi n_0^3 r V_m}{\lambda g} L \times \frac{\sin(n\varphi/2)}{(\varphi/2)} \times \sin(\omega_m t - n\varphi/2) \quad \text{(Eq. 2)}$$

In (Eq. 2) $n_0$ is the refractive index, L is the perimeter of the ring, r is the electro-optic coefficient of the material, $\lambda$ is the optical wavelength, g is the electrode gap and $\varphi=\omega_m$/FSR where FSR is defined by $c/(n_0 L)$. The microwave signal in (Eq. 2) is assumed to be in the form of $V(t)=V_m \sin(\omega_m t)$.

Nonlinearity and third order intermodulation distortion signal power can be analyzed by calculating output power of harmonic frequencies versus the applied voltage. Third order intermodulation distortion signal amplitude can be expanded to the linear mixing of amplitudes in odd harmonics starting from third harmonic utilizing multinomial theorem as shown in (Eq. 3). See, for example, S. Hunziker and W. Baechtold, "Simple model for fundamental intermodulation analysis of RF amplifiers and links," *Electronics Letters*, vol. 32, pp. 1826-1827, 1996.

$$E_{out}^{IMD3} = \frac{3}{4}a_3 V_m^3 + \frac{25}{8}a_5 V_m^5 + \frac{735}{64}a_7 V_m^7 + \ldots \quad \text{(Eq. 3)}$$

where $\alpha$ are the coefficients of the Taylor series in expansion of transfer function about the direct current bias voltage. The third harmonic is the major contribution to the third order intermodulation distortion signal power. To design a modulator with high spur-free dynamic range it is desirable to suppress third harmonic parts of the third order intermodulation distortion. By writing $e^{-i(n\theta+\delta_n \sin(\omega_m t - n\varphi))}$ part of (Eq. 1) in a Bessel expansion, the output power at even and odd harmonics can be obtained as following:

$$\left|\frac{E_{out}(t)}{E_{in}(t)}\right|^2_{odd} = \quad \text{(Eq. 4)}$$

$$\left|\tau - (1-\tau^2)\sum_{n=1}^{\infty}\tau^{n-1}\alpha^n \times \left[-\sin(n\theta)2J_h(\delta_n)\sin(h\omega_m t - hn\varphi/2) - i\cos(n\theta)2J_h(\delta_n)\sin(h\omega_m t - hn\varphi/2)\right]\right|^2$$

$$\left|\frac{E_{out}(t)}{E_{in}(t)}\right|^2_{even} = \left|\tau - (1-\tau^2)\sum_{n=1}^{\infty}\tau^{n-1}\alpha^n \times \right. \quad \text{(Eq. 5)}$$

$$\left[\cos(n\theta)2J_h(\delta_n)\cos(h\omega_m t - hn\varphi/2) - i\sin(n\theta)2J_h(\delta_n)\cos(h\omega_m t - hn\varphi/2)\right]\bigg|^2$$

Figure 2:
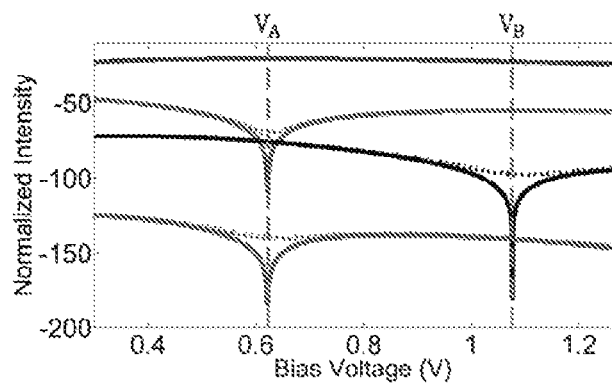
FIG. 2 is a graph of normalized output intensities in fundamental, second-harmonic, third-harmonic and fifth-harmonic frequencies versus bias voltages in 1 hertz (lines), and 500 megahertz (dot lines) operating frequencies. Results are for input radio frequency power of −10 decibel-milliwatts and a ring resonator modulator with 9 millimeters perimeter. Output intensity is in logarithmic scale and normalized versus input intensity.

Using these equations, output powers for fundamental, second, third, and fifth harmonics are calculated in the range of bias voltages and in 1 hertz and 500 megahertz frequencies (FIG. 2). Two critical bias voltages are well noticed ($V_A$ and $V_B$). At bias point $V_A$, second and fifth harmonics are suppressed while at $V_B$, the third harmonic has minimum power. The Lorentzian-shaped transfer function of ring resonator modulator has a bias point where the output power in third harmonic is minimum, while the fundamental signal has considerable amount of power, resulting in higher spur-free dynamic range compared to Mach-Zehnder Interferometer modulators. Therefore, $V_B$ is mentioned in literatures as the optimum bias for the ring resonator modulators to obtain high spur-free dynamic range. However, by increasing the radio frequency operating frequency from 1 hertz to 500 megahertz the suppressing of the harmonics at $V_A$ and $V_B$ is diminished considerably resulting in spur-free dynamic range reduction.

Figure 3:
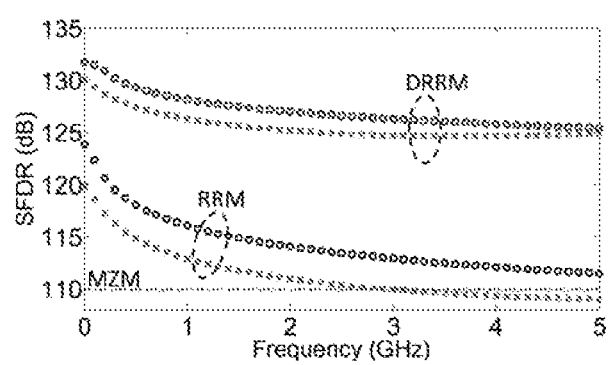
FIG. 3 is a graph of spur-free dynamic range versus radio frequency operating frequency for single ring resonator modulator and dual ring resonator modulator in two perimeters (circle: 3 millimeters, cross: 9 millimeters). Dotted line shows the spur-free dynamic range of a Mach-Zehnder Interference with the same link parameters. Spur-free dynamic range is calculated for 1 hertz noise bandwidth.

To obtain spur-free dynamic range, a two tone test and numerical Fourier method is utilized with typical link parameters. See, for example, W. B. Bridges and J. H. Schaffner, "Distortion in linearized electrooptic modulators," *Microwave Theory and Techniques, IEEE Transactions on*, vol. 43, pp. 2184-2197, 1995. FIG. 3 presents the calculated spur-free dynamic range for the ring resonator modulator with two perimeter sizes that is biased at $V_B$ in the range of radio frequency operating frequency up to 5 gigahertz. Decreasing the length of the ring results in improving the spur-free dynamic range in wider bandwidth. However the sensitivity of the modulator is decreased for a smaller ring. Biasing the single ring resonator modulator at $V_B$ will provide relatively high spur-free dynamic range at narrow bandwidths. To increase the spur-free dynamic range at wider bandwidths it is necessary to suppress the third harmonic power utilizing other methods.

Dual Ring Resonator

An approach of using dual ring resonator modulators (DRRM) to cancel or reduce the third order harmonic portion of the third order intermodulation distortion is presented. Producing equal powers of the third order harmonic at dual ring resonator modulators with 180 degrees phase difference the third order harmonic can exactly be cancelled. However, the cancellation process of the third harmonic power will also slightly suppress the fundamental signal. To yield the maximum spur-free dynamic range, the optical and radio frequency powers are divided between the two modulators in a specific ratio to have minimum cancellation of the fundamental signal while keeping the maximum cancellation for the third harmonic distortion.

In a single ring resonator modulator by applying two tone signal to (Eq. 1) and using Bessel expansions the following relations are obtained for output radio frequency signal and third order intermodulation distortion powers:

$$P_{IMD3} \propto \qquad \text{(Eq. 6)}$$

$$\left| \tau - (1-\tau^2)\sum_{n=1}^{\infty} \tau^{n-1}\alpha^n \times [-\sin(n\theta)2J_1(\delta_n)J_2(\delta_n) - i\cos(n\theta)2J_1(\delta_n)J_2(\delta_n)] \right|^2$$

$$P_{Fun} \propto \qquad \text{(Eq. 7)}$$

$$\left| \tau - (1-\tau^2)\sum_{n=1}^{\infty} \tau^{n-1}\alpha^n \times [-\sin(n\theta)2J_0(\delta_n)J_1(\delta_n) - i\cos(n\theta)2J_0(\delta_n)J_1(\delta_n)] \right|^2$$

third order intermodulation distortion signal power is related to the product of Bessel functions, $J_1(\delta_n) J_2(\delta_n)$, however fundamental signal is proportional to the $J_0(\delta_n) J_1(\delta_n)$ product. For small radio frequency signals the $\delta_n \ll 1$ is satisfied and the $J_0(\delta_n) J_1(\delta_n)$ and $J_1(\delta_n) J_2(\delta_n)$ products can be expanded in a linear expansion as follows (see, for example, L. M. Johnson and H. Roussell, "Reduction intermodulation distortion in interferometric optical modulators," *Optics letters*, vol. 13, pp. 928-930, 1988):

$$J_0(\delta_n)J_1(\delta_n) = -\delta_n + \text{higher orders} \qquad \text{(Eq. 8)}$$

$$J_1(\delta_n)J_2(\delta_n) = -\frac{1}{16}\delta_n^3 + \text{higher orders}$$

These equations show that the output fundamental signal power has a linear modulation index dependence while the third order intermodulation distortion signal power has a cubic modulation index dependence. For instance, if the radio frequency input power increased 2 times, the output third order intermodulation distortion power is expected to increase eight times, while output signal power will be 2 times more. However, by decreasing the optical carrier power eight times the output third order intermodulation distortion power will remain at the same level. Therefore, to cancel the third order harmonic of third order intermodulation distortion, two ring resonator modulators with divided radiofrequency power at ratio F:1 can be utilized, but the optical power ratio, in some embodiments, is the inverse cube of the radio frequency voltage, i.e. $1:F^3$. Other ratios are possible and may be preferred according to the type of the material used, the fabrication process, and design tolerances.

Referring again to FIG. 1, the figure illustrates an electro-optic modulator 10 having a dual ring resonator modulator. The electro-optic modulator 10 is part of a microwave photonic link 15. The microwave photonic link 15 includes an optical source 20, a first optical fiber 25, the electro-optic modulator 10, a radio frequency source 30, a second optical fiber 35, a photo detector 40, and a radio frequency output 45.

The optical source 20 provides optical power. The optical source 20 can consist of a laser, and the optical source provides a carrier signal for the electro-optic modulator 10. The radio frequency source 30 provides radio frequency power. The radio frequency source 30 can be a radio frequency generator, and the radio frequency power can be a communication signal carrying information.

The optical signal from the first optical fiber 25 is provided to a waveguide 50 fabricated on a substrate 55. The waveguide 50 has multiple segments as discussed further below. The waveguide 50 can be made of a polymer type material, or other known materials (e.g. lithium niobate, silicon) for providing a waveguide, and the substrate can be made of a silicon-based material or other known material for supporting the structure. Other waveguides fabricated on the substrate 55, such as the ring waveguides discussed below, can be made of the polymer type material, or other known materials for providing a waveguide. Moreover, the structure shown for the electro-optic modulator 10 in FIG. 1 is a top view of the structure. The cross section structure (e.g., rib type, inverted rib type, step index channel) of the waveguides fabricated on the substrate 55 can also effect the modulation properties of the electro-optic modulator 10.

The waveguide 50 includes an input waveguide 60 coupled to the first optical fiber 25. The input waveguide 60 receives a first optical power. The input waveguide 60 guides the optical power from the first optical fiber 25 to an optical splitter 65. The optical splitter 65 splits the first optical power into a first straight waveguide 70 and a second straight waveguide 75. The optical splitter 65 splits the first optical power into a second optical power O for the first straight waveguide 70 and a third optical power 1-O for the second straight waveguide 75. The second optical power O and the third optical power 1-O are related values. For example, if the first straight waveguide 70 receives 60% of the first optical power, then the second straight waveguide 75 receives 40% of the first optical power.

Figure 6:
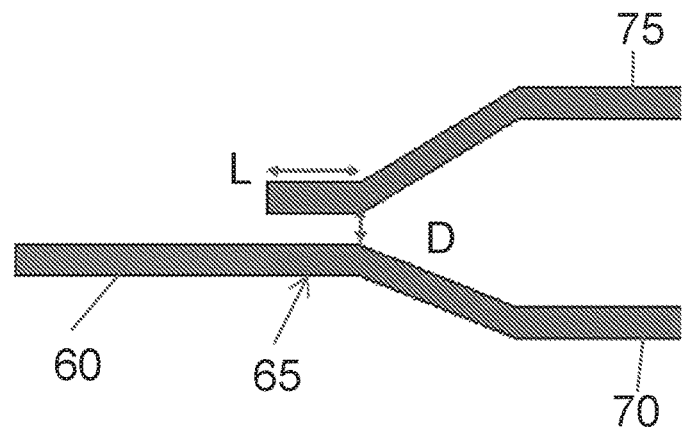
FIG. 6 is a schematic illustrating an enlarged portion of a waveguide in FIG. 1.

The optical splitter 65 includes a tab portion 67 having a length L. Also the tab portion is spaced from the input waveguide 60 by a distance D. The length L and the distance D help specify the ratio of powers being provided to each straight waveguide 70 and 75. The length L and the distance D are schematically shown in FIG. 6, which enlarges a portion of the waveguide 50. Other techniques for splitting optical power in the waveguide can be used as known in the art.

The second optical power O transmits along the first straight waveguide 70 and modulates with a second radio frequency power 1-F at a first ring resonator modulator 80 (please note that the first radio frequency power will be discussed below). The second optical power O modulates with the second radio frequency power 1-F to result in a first resultant power. Similarly, the third optical power 1-O transmits along the second straight waveguide 75 and modulates with a third radio frequency power F at a second ring resonator modulator 85. The third optical power 1-O modulates with the third radio frequency power F to result in a second resultant power.

The first straight waveguide 70 and the second straight waveguide 75 combine at an optical coupler 90. The optical coupler 90 couples the first resultant power with the second resultant power to result in a third resultant power. The third resultant power is provided to the second optical fiber 35 at an output waveguide 95. The second optical fiber 35 communicates the third resultant power to the photo detector 40. The photo detector 40 converts the optical power into radio frequency power for transmission at the radio frequency output 45.

The radio frequency source 30 provides a first radio frequency power (i.e., electrical power). The radio frequency source 30 can be an antenna receiving data via an electrical signal. The first radio frequency power is provided to an electrical circuit 97. The electrical circuit 97 includes multiple circuit paths, which one skilled in the art may also refer to as being circuits. The electrical circuit 97 includes a first circuit path 100 for receiving the first radio frequency power from the radio frequency source 30.

The first circuit path 100 provides the first radio frequency power to a radio frequency power divider 105. The radio frequency power divider 105 splits the first radio frequency power into a second circuit path 110 and a third circuit path 115. The radio frequency power divider 105 splits the first radio frequency power into a second radio frequency power 1-F for the second circuit path 110 and a third radio frequency power F for the third circuit path 115. The second radio frequency power 1-F and the third radio frequency power F are related values. For example, if the third circuit path 115 receives 60% of the first radio frequency power, then the second circuit path 110 receives 40% of the first optical power.

Figure 7:
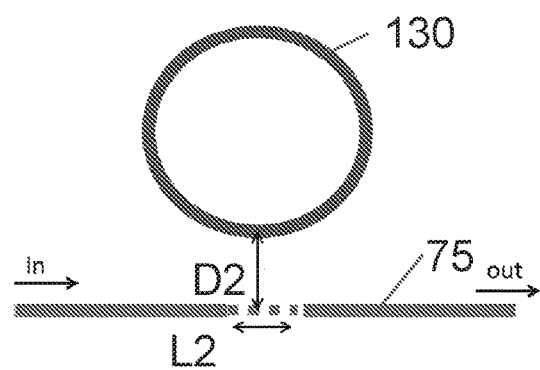
FIG. 7 is a schematic illustrating an enlarged portion of a straight waveguide and a ring waveguide in FIG. 1.

The second radio frequency power 1-F is communicated along the second circuit path 110 to the first ring resonator modulator 80. The second radio frequency power 1-F modulates the second optical power O to result in the first resultant power, as already mentioned. Similarly, the third radio frequency power F is communicated along the third circuit path 115 to the second ring resonator modulator 85. The third radio frequency power F modulates the third optical power 1-O to result the second resultant power, as already mentioned The first ring resonator modulator 80 includes an optical portion and an electrical portion. The optical portion includes the first straight waveguide 70 and a first ring waveguide 130. The first straight waveguide 70 and the first ring waveguide 130 are optically coupled, in part, by a coupling distance D2 and a coupling length L2. The distance D2 and the length L2 help specify the optical power being provided from the first straight waveguide 70 to the first ring waveguide 130 and vice-versa. The distance D2 and the length L2 are schematically shown in FIG. 7, which enlarges a portion of the waveguide 50. The electrical portion includes a first electrode 125 and a second electrode 135. The second radio frequency power 1-F applied to the first electrode 125 changes the effective refractive index of the first ring waveguide 130, thereby altering the resonance frequency of the first ring resonator modulator 80. The altering of the resonance frequency modulates the optical carrier signal, i.e., the second optical power, according to the applied RF signal, i.e., the second radio frequency power.

The first ring waveguide 130 defines a diameter for the first ring resonator modulator 80. The distance between the first ring waveguide 130 and the straight waveguide 70 can change according to the design preference, fabrication tolerance, and process and type of the utilized material. For the embodiment shown, the second ring resonator modulator 85 has an analogues design to the first ring resonator modulator 80. Moreover, other ring resonator modulator designs can be used in place of the shown ring resonator modulators 80 and 85. For example, the design and location of the electrodes 125 and 135 can change from the structure shown based on the type of the electro-optic material used to maximize the electro-optic coefficient. Also, the number of ring resonator modulators can be changed, such as to cancel out higher order harmonics.

In one implementation, the first ring resonator modulator 80 receives higher optical power via the first straight waveguide 70 while being driven by less radio frequency power 1-F via the second circuit path 110, and the second ring resonator modulator 85 receives less optical power via the second straight waveguide 75 while being driven by higher radio frequency power F via the third circuit path 115. The optical power ratio between the ring resonator modulators 80 and 85 can be set by the coupling ratio of the optical splitter 65. The radio frequency power ratio between the ring resonator modulators 80 and 85 can be set by the coupling ratio of the radio frequency power divider 105. If the radio frequency power ratio and the optical power ratio are designed properly, then the third harmonic produced from the ring resonator modulators 80 and 85 could be equal and the distortion can theoretically cancel at the output. It is inevitable that with this method there will be some cancellations of the spur-free dynamic range signal, but the spur-free dynamic range will be maximized at wider bandwidths than previously reported.

Figure 4:
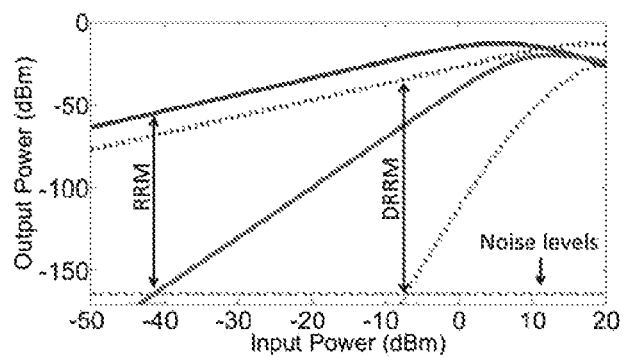
FIG. 4 is a graph of output fundamental and third order intermodulation distortion powers against the radio frequency input power. Lines are the results for a single ring resonator modulator and dots are for the results of a dual ring resonator modulator. Results are for 9 millimeter rings biased at $V_A$. Noise level is at −164 decibel-milliwatts in 1 hertz bandwidth.

The output power versus input power for the fundamental and the third order intermodulation distortion for ring resonator modulators and dual ring resonator modulators with F=3 are shown in FIG. 4. In the dual ring resonator modulator, third order intermodulation distortion power is suppressed more than fundamental signal, thereby yielding an enhancement in spur-free dynamic range as marked in FIG. 4. It is worth mentioning that the third order intermodulation distortion versus input power in a single structure has a slope equal to 3 showing third order harmonic contribution in third order intermodulation distortion. Having a linearization process in the dual ring resonator modulator, the slope of third order intermodulation distortion increases to 7, therefore by biasing the modulators at the proper voltage and having dual ring resonator modulators with the proper power ratio of radio frequency and optical powers both third and fifth order harmonics are cancelled.

Figure 5:
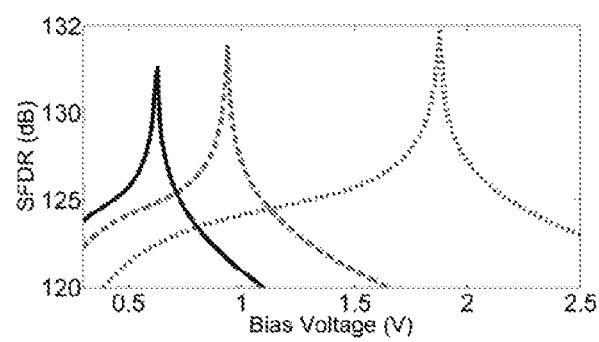
FIG. 5 is a graph of spur-free dynamic range in dual ring resonator modulators versus bias voltage for three perimeters of the ring (line: 9 millimeters, dash: 6 millimeters and, dot: 3 millimeters). The radio frequency operating frequency is 1 hertz and system noise bandwidth is 1 hertz.

To obtain optimum bias voltage in dual ring resonator modulators, spur-free dynamic range is calculated in a wide range of the bias voltages, as shown in FIG. 5. Bias voltage that has higher spur-free dynamic range in dual ring resonator modulator is the $V_A$ bias point in single ring resonator modulator because of the fifth harmonic cancellation at this bias voltage. A spur-free dynamic range of more than 130 decibels is achievable with dual ring resonator modulators indicating the highly linear behavior of the modulator. As shown in FIG. 5, by decreasing the perimeter from 9 millimeters to 3 millimeters, the maximum spur-free dynamic range is slightly increased.

In FIG. 3, variation of the spur-free dynamic range versus operating radio frequency is shown for two ring perimeters. When the operating radio frequency is 1 hertz, the complete suppression of the fifth order harmonic comes with biasing at $V_A$. However, by working at higher frequencies, fifth harmonic contribution in third order intermodulation distortion power increases reducing spur-free dynamic range. Using a dual ring resonator modulation structure provides cancellation of the third harmonic in a wide bandwidth, resulting in a spur-free dynamic range of >125 decibels in 5 gigahertz bandwidth. By decreasing the perimeter of the ring, from 9 millimeters to 3 millimeters, it is observed to have approximately 2 decibel improvement in spur-free dynamic range of more than 127 decibels in 5 gigahertz bandwidth.

CONCLUSION

A dual ring resonator is disclosed as an electro-optic modulator to obtain high spur-free dynamic range at wide bandwidths for microwave photonic links. The nonlinear distortion in ring resonator modulators was analyzed to determine that by dividing the radio frequency and optical powers in specific ratios between two ring resonator modulators, the third harmonic distortion of the third order intermodulation distortion can be cancelled. This highly linear modulator with optimum bias points achieves a theoretical spur-free dynamic range of more than 130 decibels for a 1 hertz bandwidth. For wide bandwidth operations increasing the operating frequency resulted in a diminished suppression of fifth harmonic, however the third order harmonic can still be suppressed using the dual ring resonator modulators yielding a highly linear modulator for wide bandwidth applications. The proposed dual ring resonator modulator structure provides greater than 125 decibel spur-free dynamic range in a 5 gigahertz bandwidth. Additionally this modulator can be easily fabricated, has a smaller size, low power consumption, and less complexity in comparison with Mach-Zehnder Interferometers based linearized modulators.

The following references were cited above and are incorporated herein by reference:

"Wireless future drives microwave photonics," Nat Photon, vol. 5, pp. 724-724, 12//print 2011.

M. L. VanBlaricum, "Photonic systems for antenna applications," Antennas and Propagation Magazine, IEEE, vol. 36, pp. 30-38, 1994.

M. Nazarathy, J. Berger, A. J. Ley, I. M. Levi, and Y. Kagan, "Progress in externally modulated AM CATV transmission systems," Lightwave Technology, Journal of, vol. 11, pp. 82-105, 1993.

V. J. Urick, F. Bucholtz, J. D. McKinney, P. S. Devgan, A. L. Campillo, J. L. Dexter, et al., "Long-haul analog photonics," Journal of Lightwave Technology, vol. 29, pp. 1182-1205, 2011.

C. H. Cox III and C. H. Cox, Analog optical links: theory and practice: Cambridge University Press, 2006.

J. Cardenas, P. A. Morton, J. B. Khurgin, A. Griffith, C. B. Poitras, K. Preston, et al., "Linearized silicon modulator based on a ring assisted Mach Zehnder inteferometer," Optics express, vol. 21, pp. 22549-22557, 2013.

N. Madamopoulos, B. Dingel, and A. Prescod, "Interferometric modulator with phase-modulating and cavity-modulating components (IMPACC) for high linearity microwave applications: technology review," in International Conference on Photonics Solutions 2013, 2013, pp. 88830O-88830O-12.

A. Agarwal, T. Banwell, P. Toliver, and T. Woodward, "Predistortion compensation of nonlinearities in channelized RF photonic links using a dual-port optical modulator," Photonics Technology Letters, IEEE, vol. 23, pp. 24-26, 2011.

G. Zhang, X. Zheng, S. Li, H. Zhang, and B. Zhou, "Postcompensation for nonlinearity of Mach-Zehnder modulator in radio-over-fiber system based on second-order optical sideband processing," Optics letters, vol. 37, pp. 806-808, 2012.

S.-K. Kim, W. Liu, Q. Pei, L. R. Dalton, and H. R. Fetterman, "Nonlinear intermodulation distortion suppression in coherent analog fiber optic link using electro-optic polymeric dual parallel Mach-Zehnder modulator," Optics express, vol. 19, pp. 7865-7871, 2011.

H. Tazawa and W. H. Steier, "Bandwidth of linearized ring resonator assisted Mach-Zehnder modulator," Photonics Technology Letters, IEEE, vol. 17, pp. 1851-1853, 2005.

A. Prescod, B. B. Dingel, N. Madamopoulos, and R. Madabhushi, "Effect of ring resonator waveguide loss on SFDR performance of highly linear optical modulators under suboctave operation," Photonics Technology Letters, IEEE, vol. 22, pp. 1297-1299, 2010.

A. Ayazi, T. Baehr-Jones, Y. Liu, A. E.-J. Lim, and M. Hochberg, "Linearity of silicon ring modulators for analog optical links," Opt. Express 20 (12), pp. 13115-13122, 2012.

W. Fegadolli, J. E. B. Oliveira, and V. R. Almeida, "Highly linear electro-optic modulator based on ring resonator," Microwave and Optical Technology Letters, vol. 53, pp. 2375-2378, 2011.

B. Bortnik, Y.-C. Hung, H. Tazawa, B.-J. Seo, J. Luo, A. K.-Y. Jen, et al., "Electrooptic polymer ring resonator modulation up to 165 GHz," Selected Topics in Quantum Electronics, IEEE Journal of, vol. 13, pp. 104-110, 2007.

I. L. Gheorma and R. M. Osgood, "Fundamental limitations of optical resonator based high-speed EO modulators," Ieee Photonics Technology Letters, vol. 14, pp. 795-797, June 2002.

H. Zhang, M.-C. Oh, A. Szep, W. H. Steier, C. Zhang, L. R. Dalton, et al., "Push-pull electro-optic polymer modulators with low half-wave voltage and low loss at both 1310 and 1550 nm," Applied Physics Letters, vol. 78, pp. 3136-3138, 2001.

A. Yariv, "Universal relations for coupling of optical power between microresonators and dielectric waveguides," Electronics Letters, vol. 36, pp. 321-322, 2000.

S. Hunziker and W. Baechtold, "Simple model for fundamental intermodulation analysis of RF amplifiers and links," Electronics Letters, vol. 32, pp. 1826-1827, 1996.

W. B. Bridges and J. H. Schaffner, "Distortion in linearized electrooptic modulators," Microwave Theory and Techniques, IEEE Transactions on, vol. 43, pp. 2184-2197, 1995.

L. M. Johnson and H. Roussell, "Reduction intermodulation distortion in interferometric optical modulators," Optics letters, vol. 13, pp. 928-930, 1988.

Thus, the invention provides, among other things, a new and useful electro-optic modulator, a microwave photonic link including an electro-optic modulator, and a method of communicating a signal with an electo-optic modulator. Various features and advantages of the invention are set forth in the following claims.

What is claimed is:

1. A microwave photonic link comprising:
   an optical source providing an optical power;
   a radio frequency source providing a radio frequency power;
   an electro-optic modulator coupled to the optical source and the radio frequency source, the electro-optic modulator comprising
      a wave guide receiving the optical power,
      a first ring resonator modulator and a second ring resonator modulator receiving the radio frequency power, the first ring resonator modulator and the second ring resonator modulator coupled to the waveguide for modulating the optical power with the radio frequency power, thereby providing a resultant power, and substantially suppressing third order intermodulation distortion of the resultant power; and
   a radio frequency power divider to divide the radio frequency power into a first radio frequency power and a second radio frequency power, and
   wherein the first ring resonator modulator receives the first radio frequency power and the second ring resonator modulator receives the second radio frequency power.

2. The microwave photonic link of claim 1, wherein the waveguide includes an optical splitter,
   wherein the optical splitter splits the optical power into a first optical power for the first ring resonator modulator and a second optical power for the second ring resonator modulator,
   wherein the first ring resonator modulator modulates the first optical power with the first radio frequency power, and
   wherein the second ring resonator modulator modulates the second optical power with the second radio frequency power.

3. The microwave photonic link of claim 2, wherein the waveguide includes an input waveguide receiving the optical power, the optical splitter coupled to the input waveguide, and a first waveguide segment and a second waveguide segment, both of which are coupled to the optical splitter.

4. The microwave photonic link of claim 3, wherein the optical splitter includes a tab portion spaced from the input waveguide by a distance and the tab portion having a length.

5. The microwave photonic link of claim 3, wherein the waveguide further includes an optical coupler coupled to the first waveguide segment and the second waveguide segment, and an output waveguide coupled to the optical coupler.

6. The microwave photonic link of claim 5, wherein the modulating of the first optical power with the first radio frequency power results in a first resultant power,
   wherein the modulating of the second optical power with the second radio frequency power results in a second resultant power, and
   wherein the optical coupler couples the first resultant power with the second resultant power to result in a third resultant power, the third resultant power having a substantially suppressed third order intermodulation distortion.

7. The microwave photonic link of claim 3, wherein the first ring resonator modulator includes the first waveguide segment and a ring waveguide.

8. The microwave photonic link of claim 7, wherein the first ring resonator modulator further comprises a first electrical contact receiving the first radio frequency power.

9. The microwave photonic link of claim 3, wherein the first waveguide segment is a straight waveguide.

10. The microwave photonic link of claim 1, and further comprising an optical fiber coupling the optical source to the electro-optic modulator.

11. The electro-optic modulator of claim 10, wherein the optical power includes a carrier signal and the radio frequency power includes a communication signal.

12. The microwave photonic link of claim 1, and further comprising a photodetector and a second optical fiber coupling the electro-optic modulator with the photodetector.

13. The microwave photonic link of claim 1, wherein the optical power includes a carrier signal and the radio frequency power includes a communication signal.

14. An electro-optic modulator for coupling to an optical source generating an optical power and a radio frequency source generating a radio frequency power, the electro-optic modulator comprising:
   a waveguide to receive the optical power; and
   a first ring resonator modulator and a second ring resonator modulator to receive the radio frequency power, the first ring resonator modulator and the second ring resonator modulator coupled to the waveguide for modulating the optical power with the radio frequency power, thereby providing a resultant power, and substantially suppressing third order intermodulation distortion of the resultant power,
   wherein the radio frequency power includes a first radio frequency power and a second radio frequency power, and
   wherein the first ring resonator modulator receives the first radio frequency power and the second ring resonator modulator receives the second radio frequency power.

15. The electro-optic modulator of claim 14, wherein the waveguide includes an optical splitter,
   wherein the optical splitter splits the optical power into a first optical power for the first ring resonator modulator and a second optical power for the second ring resonator modulator,
   wherein the first ring resonator modulator modulates the first optical power with the first radio frequency power, and
   wherein the second ring resonator modulator modulates the second optical power with the second radio frequency power.

16. The electro-optic modulator of claim 15, wherein the waveguide includes an input waveguide receiving the optical power, the optical splitter coupled to the input waveguide, and a first waveguide segment and a second waveguide segment, both of which are coupled to the optical splitter.

17. The electro-optic modulator of claim 16, wherein the optical splitter includes a tab portion spaced from the input waveguide by a distance and the tab portion having a length.

18. The electro-optic modulator of claim 16, wherein the waveguide further includes an optical coupler coupled to the first waveguide segment and the second waveguide segment, and an output waveguide coupled to the optical coupler.

19. The electro-optic modulator of claim 16, wherein the first ring resonator modulator includes the first waveguide segment and a ring waveguide.

20. The electro-optic modulator of claim 16, wherein the first waveguide segment is a straight waveguide.

* * * * *